(12) United States Patent
Jetzlaff et al.

(10) Patent No.: US 11,597,129 B2
(45) Date of Patent: Mar. 7, 2023

(54) APPARATUS AND METHOD FOR SIMULTANEOUSLY MANUFACTURING A PLURALITY OF SINGLE-USE PLASTIC MOLDS FOR MAKING OPHTHALMIC LENSES THROUGH INJECTION MOLDING

(71) Applicant: Alcon Inc., Fribourg (CH)

(72) Inventors: Eduard Jetzlaff, Schollbrunn (DE); Yasin Acikgoez, Munster (DE); Halina Heidrich, Kahl am Main (DE)

(73) Assignee: Alcon Inc., Fribourg (CH)

(\*) Notice: Subject to any disclaimer, the term of this patent is extended or adjusted under 35 U.S.C. 154(b) by 198 days.

(21) Appl. No.: 16/738,425

(22) Filed: Jan. 9, 2020

(65) Prior Publication Data
US 2020/0223115 A1  Jul. 16, 2020

Related U.S. Application Data

(60) Provisional application No. 62/790,768, filed on Jan. 10, 2019.

(51) Int. Cl.
| | | |
|---|---|---|
| *B29C 45/42* | (2006.01) | |
| *B29C 45/26* | (2006.01) | |
| *B29D 11/00* | (2006.01) | |
| *B29C 33/38* | (2006.01) | |
| *B29K 23/00* | (2006.01) | |

(52) U.S. Cl.
CPC ...... *B29C 45/4225* (2013.01); *B29C 33/3842* (2013.01); *B29C 45/26* (2013.01); *B29D 11/0048* (2013.01); *B29C 2045/2683* (2013.01); *B29K 2023/12* (2013.01)

(58) Field of Classification Search
USPC ....................................... 264/297.2
See application file for complete search history.

(56) References Cited

U.S. PATENT DOCUMENTS

| | | | | |
|---|---|---|---|---|
| 6,869,549 | B2 * | 3/2005 | Ansell | B29D 11/00038 |
| | | | | 264/2.3 |
| 8,535,043 | B2 * | 9/2013 | Perez | B29C 33/303 |
| | | | | 264/1.32 |
| 2003/0062640 | A1 | 4/2003 | Ansell | |

(Continued)

FOREIGN PATENT DOCUMENTS

| | | |
|---|---|---|
| EP | 1752281 B1 | 9/2011 |
| EP | 3233412 B1 | 9/2019 |
| WO | WO-2016097737 A1 * | 6/2016 ......... B29C 45/4225 |

*Primary Examiner* — Seyed Masoud Malekzadeh
(74) *Attorney, Agent, or Firm* — Sheng-Hsin Hu

(57) ABSTRACT

An apparatus for simultaneously manufacturing a plurality of plastic molds comprises:
an injection molding tool comprising a first and second molding tool halves and —a gripper tool comprising a plurality of gripper members to which suction can be applied. The first and second molding tool halves are movable into the closed position and into an open position.
A front surface of the first molding members comprises recesses to allow the formation of pins projecting from the rear surface the plastic mold into the recesses to make the plastic molds adhere to the first molding members. The gripper tool is movably arranged only in a direction parallel to the first surface into the space formed between the first and second surfaces for transferring the plastic molds to the gripper members and out of this space again.

5 Claims, 3 Drawing Sheets

(56) References Cited

U.S. PATENT DOCUMENTS

2014/0008824 A1\* 1/2014 Niu ................. B29C 31/006
　　　　　　　　　　　　　　　　　　　　264/1.1
2014/0106397 A1\* 4/2014 Rajagopal ............ B01L 3/5021
　　　　　　　　　　　　　　　　　　　　435/34
2016/0176091 A1　　6/2016 Gibson \* cited by examiner

APPARATUS AND METHOD FOR SIMULTANEOUSLY MANUFACTURING A PLURALITY OF SINGLE-USE PLASTIC MOLDS FOR MAKING OPHTHALMIC LENSES THROUGH INJECTION MOLDING This application claims the benefit under 35 USC § 119 (e) of U.S. provisional application No. 62/790,768, filed on 10 Jan. 2019, incorporated by reference in its entirety.

FIELD

The present invention relates to an apparatus and a method for simultaneously manufacturing a plurality of single-use plastic molds for making ophthalmic lenses through injection molding.

BACKGROUND

In the mass manufacture of ophthalmic lenses, in particular contact lenses such as soft contact lenses, generally two types of lens molds are used. A first type of lens mold of these two types of lens molds is reusable, while a second type of lens mold of these two types of lens molds is for single use only.

The first type of lens mold can be made of glass (for example quartz or BK7) and is re-usable after a contact lens has been molded. To make the mold ready for being re-used after a contact lens had been molded, the mold is cleaned, rinsed and dried, and is then ready for being used to manufacture the next contact lens. This first type of lens mold is comparatively expensive and more complex to manufacture, but has the advantage of being re-usable many times.

The second type of lens mold is typically made of plastic. After the mold has been used to mold a contact lens, the shape of the mold is no longer sufficiently accurate so that once a contact lens has been molded the mold is disposed of and the plastic is recycled. It is obvious that due to the capability of such molds to be used only once they must be very cheap and easy to manufacture. Accordingly, such molds are typically made of an injection-moldable material such as a polyolefin, for example polypropylene, and are manufactured through injection molding. The present invention is about this second type of mold (i.e. it is about single-use plastic molds) and their manufacture in large numbers.

Obviously, due to their capability of being used only once and due to a large number of contact lenses being manufactured, a very large number of such single-use plastic molds is needed so that an efficient and reliable manufacture of such single-use plastic molds is vital for an efficient manufacture of contact lenses using single-use plastic molds.

SUMMARY OF THE INVENTION

It is therefore an object of the present invention to provide an apparatus and method for manufacturing single-use plastic molds in large numbers in a very efficient manner.

This object is achieved by an apparatus as it is specified by the features of the independent apparatus claim, and by a method as it is specified by the features of the independent method claim. Advantageous embodiments of the apparatus and method according to the invention are the subject of the dependent claims.

In one aspect, the invention suggests an apparatus for simultaneously manufacturing a plurality of single-use plastic molds for making ophthalmic lenses such as contact lenses through injection molding. The apparatus comprises:
an injection molding tool comprising two molding tool halves, a first molding tool half and a second molding tool half, the first molding tool half having a first surface and the second molding tool half having a second surface, the first and second surfaces facing each other and being essentially plane and arranged parallel to each other,
wherein the first molding tool half comprises a plurality of first molding members which are arranged on the first surface,
and wherein the second molding tool half comprises a corresponding plurality of second molding members which are arranged on the second surface and opposite to the first molding members,
and wherein in a closed position of the two molding tool halves the corresponding first and second molding members of the first and second molding tool halves each define a cavity between them that corresponds in shape to a single-use plastic mold to be manufactured, and
a gripper tool comprising a plurality of gripper members corresponding to the plurality of first and second molding members,
wherein the gripper members are arranged on the gripper tool in a manner corresponding to the arrangement of the first and second molding members on the first and second surfaces of the first and second molding tool halves,
and wherein each of the gripper members is configured to allow suction to be applied thereto.

At least one of the first and second molding tool halves is movably arranged relative to the other of the first and second molding tool halves in a direction perpendicular to the first and second surfaces, for moving the first and second molding tool halves into a closed position, in which a flowable plastic material can be injected into the cavities defined between the oppositely arranged first and second molding members and cooled to form the demoldable single-use plastic molds, and for moving the first and second molding tool halves into an open position, in which a space is formed between the first and second surfaces.

Further, a front surface of each of the first molding members comprises at least two recesses which are arranged diametrically opposed relative to a central axis of the respective first molding member, with the recesses being arranged in a peripheral portion of the front surface of the respective first molding member that corresponds to a rear surface of a flange portion of the respective single-use plastic mold to be manufactured, the recesses being configured to allow the formation of pins projecting from the rear surface of the flange portion of the single-use plastic mold to be manufactured into the recesses in the peripheral portion of the front surface of the first molding member in order to make the single-use plastic mold adhere to the first molding member.

The gripper tool is movably arranged only in a direction parallel to the first surface of the first molding tool half into and out of the space formed between the first and second surfaces of the first and second molding tool halves in the open position, for moving the gripper tool into a transfer position in which the gripper members are arranged opposite of the first molding members so as to be capable of releasing the demoldable single-use plastic molds from first molding members and sucking them against the gripper members to transfer the demoldable single-use plastic molds from the first molding members to the gripper members, and for subsequently moving the gripper tool with the single-use plastic molds sucked against the gripper members out of the space formed between the first and second surfaces.

In accordance with a further aspect of the apparatus according to the invention, the front surface of each of the first molding members may comprise four recesses which are arranged in the peripheral portion of the front surface, the four recesses being arranged angularly equidistantly from each other when viewed in a circumferential direction.

Still in accordance with a further aspect of the apparatus according to the invention, the recesses in the front surface of the first molding members of the first molding tool half may have a depth in the range of 0.1 mm to 0.5 mm.

Yet in accordance with a further aspect of the apparatus according to the invention, the recesses in the front surface of the first molding members of the first molding tool half may have a circular cross-section with a diameter in the range of 0.5 mm to 1.5 mm.

According to a further aspect of the apparatus according to the invention, the recesses in the front surface of the first molding members of the first molding tool half may have a conical shape that is tapering in a direction away from the front surface.

Still in accordance with a further aspect of the apparatus according to the invention, the full cone angle of the conically shaped recesses may be in the range of up to 30 degrees.

In another aspect, the invention suggests a method for simultaneously manufacturing a plurality of single-use plastic molds for making ophthalmic lenses such as contact lenses through injection molding using an apparatus as described above. The method comprises the steps of:

moving the first and second molding tool halves into the closed position, injecting a flowable plastic material into the cavities defined between the oppositely arranged first and second molding members, cooling the flowable plastic material in the cavities thereby forming demoldable single-use plastic molds having pins in a flange portion of their rear surface, the pins projecting into the recesses in the peripheral portion of the front surfaces of the first molding members thereby making the demoldable single-use plastic molds adhere to the first molding members, moving the two molding tool halves into an open position by moving the first and second molding tool halves away from each other in a direction perpendicular to the first and second surfaces so as to form a space between the first and second surfaces, moving the gripper tool only in a direction parallel to the first surface of the first molding tool half into the space formed between the first and second surfaces and into a transfer position in which the gripper members of the gripper tool are arranged opposite of the demoldable single-use plastic molds adhering to the first molding members, transferring the demoldable single-use plastic molds from the first molding members to the gripper members by applying suction to the gripper members of the gripper tool to release the demoldable single-use plastic molds from the first molding members and suck the demoldable single-use plastic molds against the gripper members of the gripper tool, removing the gripper tool from the transfer position and out of the space formed between the first and second surfaces in the direction parallel to the first surface of the first molding tool half, with the single-use plastic molds sucked against the gripper members, and releasing the single-use plastic molds from the gripper members of the gripper tool by terminating the application of suction to the gripper members.

In still a further aspect of the method according to the invention, the duration of manufacture of the plurality of single-use plastic molds may be five seconds or less, and in particular may be in the range of three to five seconds.

The apparatus according to the invention has a plurality of advantages. First of all, it allows for the simultaneous manufacture of a plurality of single-use plastic molds for making ophthalmic lenses such as contact lenses and in particular soft contact lenses in one manufacturing 'cycle'. With the apparatus according to the invention, it is possible to simultaneously manufacture the said plurality of single-use plastic molds in a very short 'cycle' time. This 'cycle' time may be less than five seconds, and in particular it may be in the range of three to five seconds. This means that the entire manufacture of the said plurality of single-use plastic molds is completed within the said very short 'cycle' time so that it is possible to manufacture a very high number of single-use molds per day. The total number of single-use molds that can be manufactured per day depends on how many single-use molds are concurrently manufactured in one 'cycle'. Such highly efficient manufacture is possible, among others, through the fact that the gripper tool has to be moved into and out of the space formed between the first and second surfaces of the first and second molding tool halves only in a direction parallel to the first surface of the first molding tool half (straight linear movement), so that no movement in an additional direction is necessary. This allows to very quickly and reliably perform the movement of the gripper tool to the transfer position in which the single-use molds are transferred from the first molding members to the gripper members. Also, the movement of the first and second molding tool halves towards each other into the closed position and away from each other into the open position is a movement in only one single direction, this also allowing for quickly and reliably performing the movement. In particular, it is possible that only one of the molding tool halves is moved, for example the second molding tool half to which the single-use plastic molds do not adhere after injection-molding and cooling, while the other molding tool half, for example the first molding tool half, is arranged stationary. Thus, the distance of the gripper tool relative to the first molding tool half, and in particular the distance between the gripper members on the gripper tool and the first molding members on the first molding tool half to which the single-use molds adhere can be precisely and reliably adjusted. It is thus possible to very quickly move the gripper tool to the transfer position in which the gripper members are arranged opposite of the single-use plastic molds adhering to the first molding members of the first molding tool half without the risk of collision. To ensure that the single-use plastic molds adhere to the first molding members of the first molding tool half, the front surface of the first molding members comprises recesses which are arranged in a peripheral portion of the said front surface, these recesses being arranged diametrically opposed relative to a central axis of the respective first molding member. These recesses result in pins being formed on the rear surface of the corresponding flange portion of the of the single-use plastic mold formed during injection-molding and subsequent cooling of the flowable plastic material. These pins project into the recesses and make the single-use plastic mold adhere to the first molding member on one hand so that they cannot simply fall down, while on the other hand they do not require the application of too high forces in order to release the single-use plastic molds from the first molding members and transfer them to the gripper members. Accordingly, the single-use plastic molds can be quickly sucked against the gripper members of the gripper tool through the application of moderate suction to the gripper members without causing deformation of the single-use plastic molds, whereupon the gripper tool with the single-use plastic molds sucked against the gripper members can be quickly removed out of the space between the first and second surfaces of the first and second molding tool halves. Termination of the application of suction may then cause the single-use plastic molds to be released from the gripper members of the gripper tool, so that the single-use plastic molds may simply fall down into a container where they can be collected. This may occur during a time interval in which the next plurality of single-use plastic molds is injection-molded and cooled (i.e. with the first and second molding tool halves being in the closed position again), so that once this next plurality of single-use plastic molds is injection-molded and cooled the gripper tool is ready for being moved to the transfer position between the first and second molding tool halves after these have been moved into the open position again in order for this next plurality of single-use plastic mold to be transferred to the gripper members of the gripper tool again.

According to a particular advantageous aspect four recesses are arranged in the peripheral portion of the front surface of the first molding members and are arranged angularly equidistantly from each other when viewed in circumferential direction (i.e. one recess every 90 degrees).

A further advantageous aspect relates to the depth of the recesses which may be in the range of 0.1 mm to 0.5 mm. This measure results in pins of a corresponding length being formed which project from the rear surface of the single-use plastic molds into the recesses. A depth selected from this range on one hand provides for sufficient adherence of the single-use molds to the peripheral portion of the first molding members by means of the pins projecting from the rear surface of the flange portion of the single-use plastic molds (so that the single-use plastic molds may not inadvertently fall down but continue to adhere to the first molding members), while at the same time it allows for a reliable transfer of the single-use plastic molds from the first molding members to the gripper members through the application of a moderate suction, for example in the range of 350 mbar to 1 bar (so that the single-use plastic molds are not deformed). Another aspect in this regard relates to the shape of the recesses which may advantageously have a circular cross-section. And yet a further aspect in this regard relates to a conical shape of the recess that tapers away from the front surface. Or to say it in other words, the cross-section of the pin formed on the rear surface of the flange portion of the single-use plastic mold decreases in a direction away from the rear surface of the single-use plastic mold, so that upon applying suction the pins may easily slip out of the recess. The full cone angle may advantageously be in the range of up to 30 degrees. While generally cylindrical (non-conical) pins are suitable, conical pins (even with small cone angles close to zero) facilitate the release of the single-use plastic mold from the first molding member upon the application of suction to the gripping member.

Regarding the method for simultaneously manufacturing a plurality of single-use plastic molds, the advantages have already been discussed above. The method allows to simultaneously manufacture a plurality of single-use plastic molds for making ophthalmic lenses such as contact lenses and in particular soft contact lenses in one manufacturing 'cycle' in a very short 'cycle' time. This 'cycle' time may be less than five seconds, and in particular it may be in the range of three to five seconds. As mentioned above this means that the entire manufacture of the said plurality of single-use plastic molds is completed within the said very short 'cycle' time.

BRIEF DESCRIPTION OF THE DRAWINGS

Further advantageous aspects become evident from the following description of detailed embodiments with the aid of the drawings, in which.

DETAILED DESCRIPTION

Figure 1:
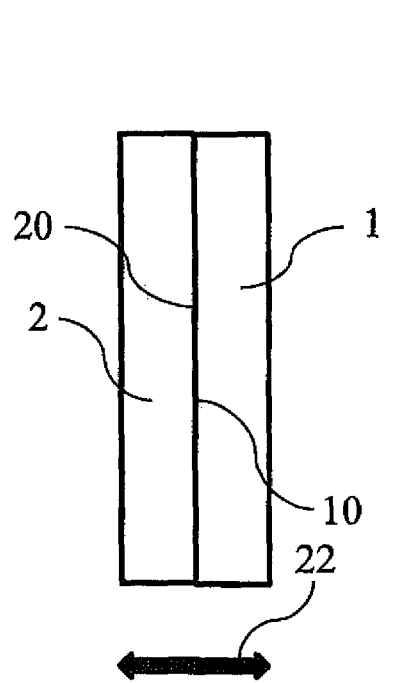
FIG. 1 shows a top view of the first and second molding tool halves of an embodiment of an apparatus according to the invention in the closed position.

FIG. 1 shows a top view of the two molding tool halves, a first molding tool half 1 and a second molding tool half 2, of an embodiment of the apparatus according to the invention, in the closed position. The first molding tool half 1 has a first surface 10, and the second molding tool half 2 has a second surface 20. The first molding tool half 1 comprises a plurality of first molding members 11 (see FIG. 3) which are arranged on the first surface 10 (the first molding members 11 can be mounted to and unmounted from the first molding tool half 1). The second molding tool half 2 comprises a corresponding plurality of second molding members 21 (see FIG. 3, dashed lines) which are arranged on the second surface 20 and opposite to the first molding members 11 arranged on the first surface 10 (the second molding members 21 can also be mounted to and unmounted from the second molding tool half 2). When the first molding tool half 1 and the second molding tool half 2 are in the closed position, as shown in FIG. 1, each of the first molding members 11 and the second molding members 21 (see FIG. 3, dashed lines) define a cavity 4 between them that corresponds in shape to the single-use plastic mold 5 to be manufactured.

In the closed position of the first molding tool half 1 and the second molding tool half 2 (FIG. 1), a flowable plastic material is injected into the cavity 4 formed between the first molding member 11 and the second molding member 21 (dashed lines in FIG. 3) and is then cooled to form a single-use plastic mold 5. As can be seen best in FIG. 3, each of the first molding members 11 comprises a central portion 110 and a peripheral portion 111 surrounding the central portion.

A front surface 112 of the peripheral portion 111 comprises at least two recesses 113 which are arranged diametrically opposed relative to a central axis 114 of the first molding member 11, and preferably comprises four recesses 113 which are arranged angularly equidistantly when viewed in circumferential direction (one recess 113 every ninety degrees). In the cross-section shown in FIG. 3 only two such recesses 113 can be seen. The recesses 113 are arranged diametrically opposed relative to a central axis 114 of the first molding member 11. In the embodiment shown, the recesses 113 provided in the front surface of the peripheral portion 111 of the first molding member 11 have a conical shape that tapers in a direction away from the front surface of the first molding member 11. While generally the recesses 113 may have a depth 116 (see FIG. 5) which is in the range of 0.1 mm to 0.5 mm (millimeters), the depth 116 shown in the embodiment may be 0.2 mm. The cross-section of the tapering recess 113 is circular in the embodiment shown, although the shape of the recess 113 may be different. Further, in the embodiment shown the full cone angle α is 30 degrees (see FIG. 6) although generally smaller cone angles are possible as well, even small cone angles close to zero are possible. The pin may also be cylindrical (cone angle is zero), however in such case the suction to be applied must be stronger.

When the flowable plastic material is injected into the cavity 4 formed between the first molding member 11 and the second molding member 21 (see FIG. 3, dashed lines) and cooled to form the demoldable single-use plastic mold 5, the single-use plastic mold 5 comprises four pins 513 that project from the rear surface of a flange portion 511 of the single-use plastic mold 5, with the said flange portion 511 surrounding a central portion 50 of the single-use plastic mold 5. The pins 513 correspond in shape to the shape of the recesses 113 and project from the rear surface of the flange portion 511 of the single-use plastic molds 5 into the recesses 113, thus making the single-use plastic mold adhere to the first molding member 11.

Figure 2:
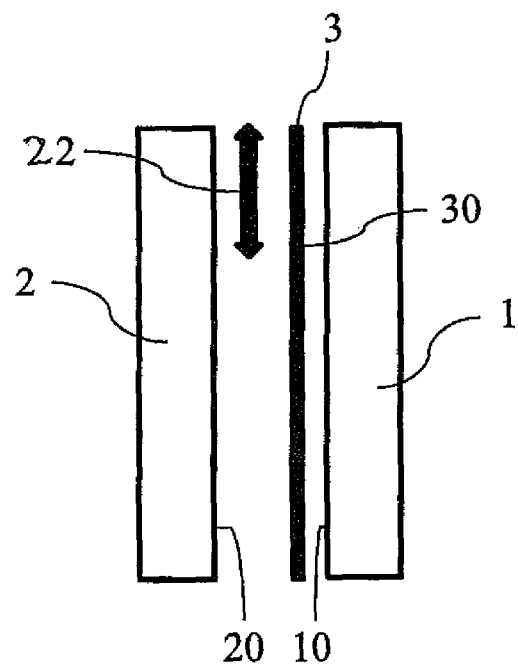
FIG. 2 shows the top view of the first and second molding tool halves of the embodiment of FIG. 1 in an open position, with the gripper tool arranged in the space between the first and second molding tool halves.

Once the single-use plastic mold 5 has been formed through injection-molding as described above, the first molding tool half 1 and the second molding tool half 2 are moved away from each other in a direction perpendicular to the first surface 10 and the second surface 20 (as indicated by double-headed arrow 22 in FIG. 1) into an open position shown in FIG. 2. By way of example and advantageously, the first molding tool half 1 is fixedly arranged and the second molding tool half 2 is movable away from the first molding tool half 1. Thus, the single-use plastic molds 5 adhering to the first molding members 11 are not moved during opening of the molding tool. However, generally it is also possible to movably arrange the first molding tool half 1 and to fixedly arrange the second molding tool half 2, or the first molding tool half 1 and the second molding tool half 2 may both be movably arranged.

A gripper tool 3 is movably arranged only in a direction parallel to the first surface 10 of the first molding tool half 1, so that it can be moved into and out of the space formed between the first molding tool half 1 (as is indicated by double-headed arrow 32). Gripper tool 3 is now moved into the space between the first surface 10 and the second surface 20 of the first molding tool half 1 and the second molding tool half 2. Since gripper tool 3 can only be moved in the direction of the double-headed arrow 32, it is possible to perform this straight linear movement of the gripper tool 3 into and out of the space between the first molding tool half 1 and the second molding tool half 2 extremely fast.

Figure 3:
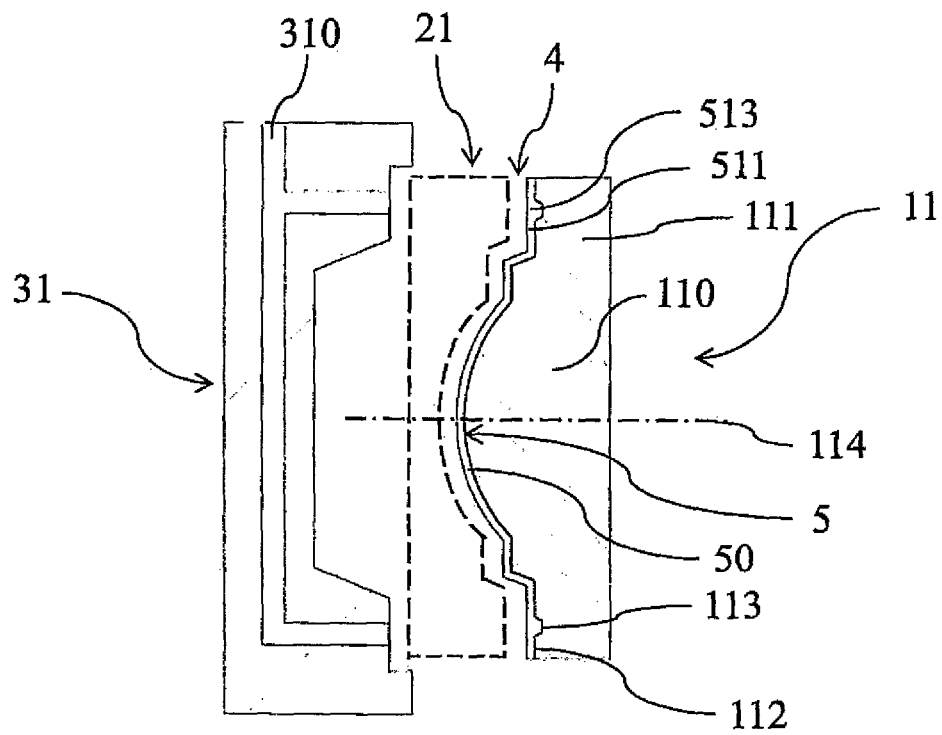
FIG. 3 shows a detail of an embodiment of the first molding member of the first molding tool half, arranged opposite of a gripper member of the gripper tool, with the corresponding second molding member also being schematically shown in dashed lines.

Gripper tool 3 comprises a plurality of gripper members 31 that corresponds to the plurality of first molding members 11 and second molding members 21. The gripper members 31 are arranged on a surface 30 of the gripper tool 3 in an arrangement that corresponds to the arrangement of the plurality of first molding members 11 and second molding members 21 on the first surface 10 of the first molding tool half 1 and the second surface 20 of the second molding tool half 2. The gripper members 31 are arranged on a surface 30 facing towards the first surface 10 of first molding tool half 1, and are provided with suction channels 310 allowing suction to be applied thereto. When the gripper tool 3 is arranged in a transfer position between the first molding tool half 1 and the second molding tool half 2, the gripper members 31 are arranged opposite of the first molding members 11, as this is shown in FIG. 3 for one of the molding members 11.

Figure 4:
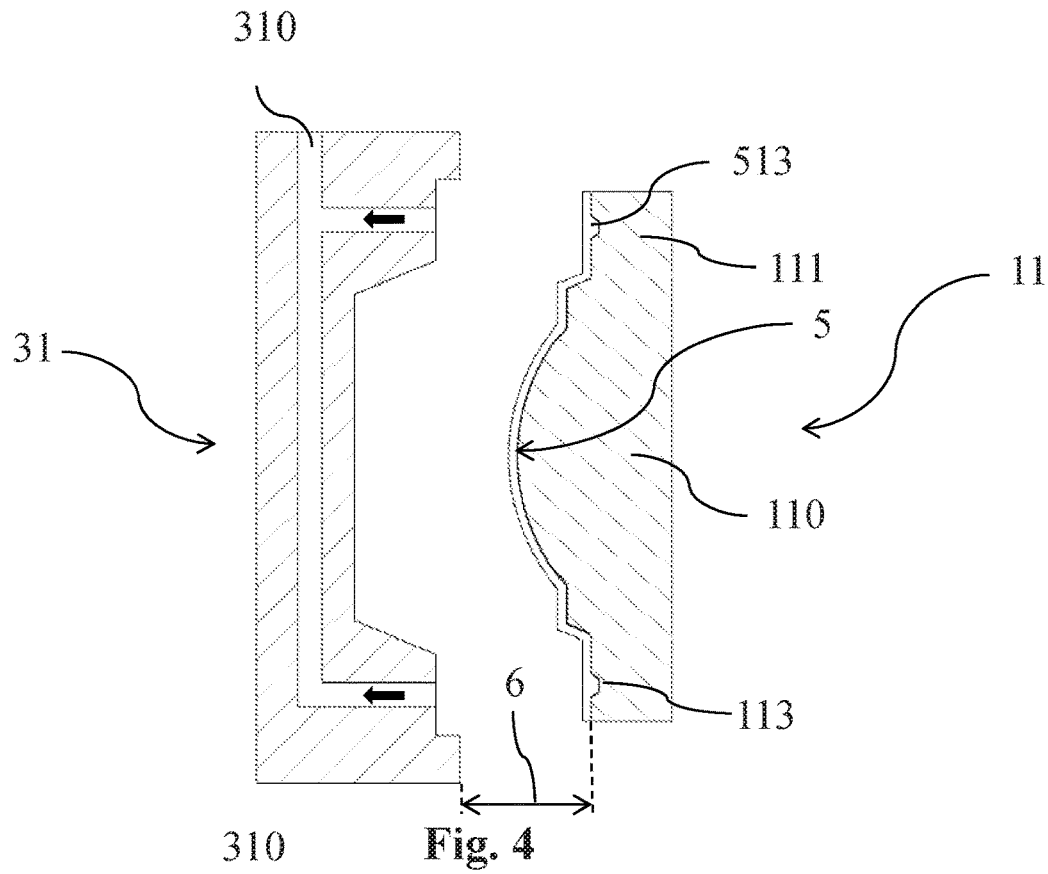
FIG. 4 shows the detail of FIG. 3 without the second molding member and with the single-use plastic mold still adhering to the first molding member.

At that time, the gripper members 30 are arranged at a predetermined distance 6 from the single-use plastic mold 5, and this distance 6 is chosen such that the extremely fast movement of the gripper tool 3 into the space between the first molding tool half 1 and the second molding tool half 2 can be performed without the risk of collision of the gripper members 31 with first molding members 11 and the single-use plastic molds 5 adhering thereto. This position is shown in FIG. 4.

Transfer of the single-use plastic mold 5 from the first molding member 11 of the first molding tool half 1 to the gripper member 31 of the gripper tool 3 is then performed by applying suction to the suction channels 310 provided in the gripper member 31 (small arrows in the suction channels 310). For example, a moderate suction in the range of 350 mbar to 1 bar is suitable to effect secure transfer of the single-use plastic mold 5 from the first molding member 11 to the gripper member 31. This scenario (single-use plastic mold 5 being transferred to the gripper member 31) is shown in FIG. 5.

Figure 5:
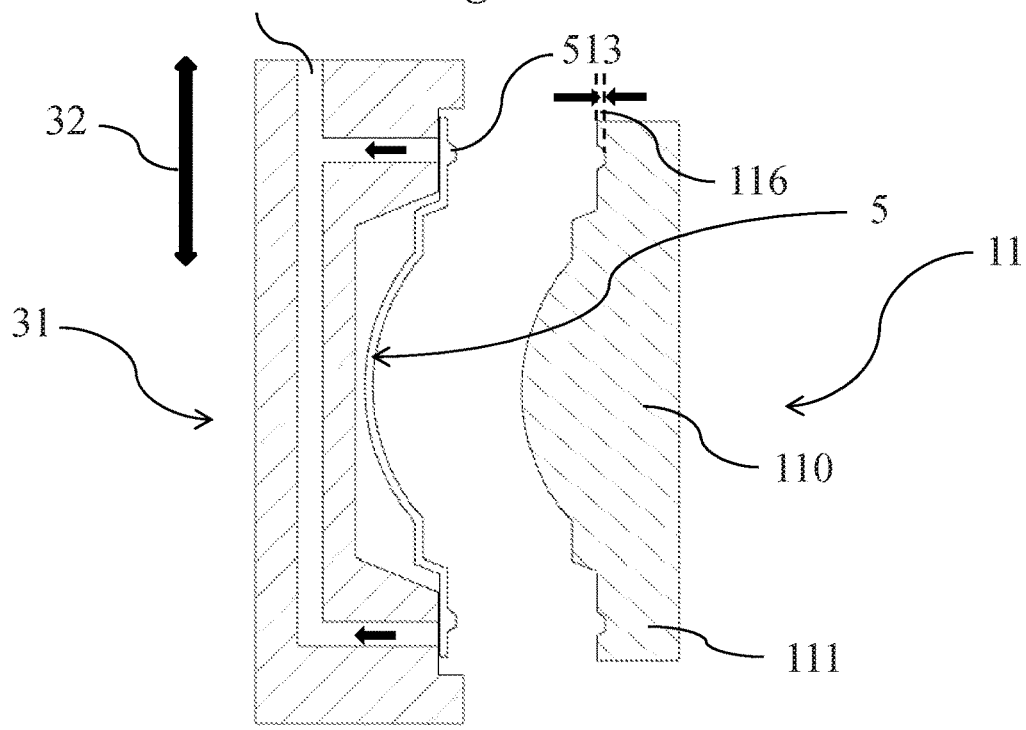
FIG. 5 shows the detail of FIG. 3 with the single-use plastic mold transferred to the gripper member.
Figure 6:
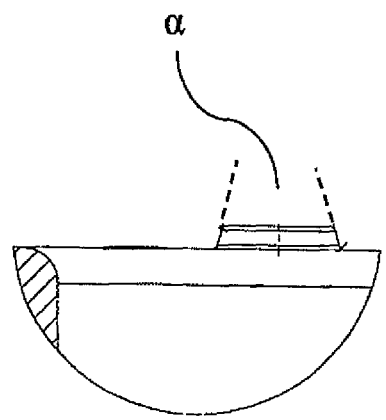
FIG. 6 shows a detail of an embodiment of the single-use plastic mold with a conical pin on the rear surface thereof.

Thereafter, the gripper tool 3 with the single-use plastic molds 5 adhering to the gripper members 31 is moved out of the space between the first surface 10 and the second surface 20 of the first molding tool half 1 and the second molding tool half 2 (see double headed-arrow 32 in FIG. 2 and FIG. 5). Once the gripper tool 3 has been moved out of this space, the first molding tool half 1 and the second molding tool half 2 are closed again (see FIG. 1) and flowable material is injected into the cavities 4 formed between the first molding members 11 and the second molding members 21. Meanwhile, the suction applied to the suction channels 310 of the gripper tool 3 is terminated allowing the single-use plastic molds 5 to fall down so that they can be collected in a suitable container (not shown). Once the flowable material in the cavities 4 has been cooled to form the demoldable single-use plastic molds 5 (closed position), the second molding tool half 2 is moved away from the first molding tool half 1 again (into the open position, see FIG. 2), the gripper tool 3 is moved into the space between the first molding tool half 1 and the second molding tool half 2 (see FIG. 2), and the remaining steps are performed as is described above.

It is noteworthy, that the time of the entire 'cycle' of closing the first and second molding tool halves, injecting and cooling the flowable material, opening the first and second molding tool halves, moving the gripper tool into the space between the first and second molding tool halves, transferring the single-use plastic molds from the first molding members of the first molding tool half to the gripper members of the gripper tool, and moving the gripper tool out of the space between the first and second surfaces of the first and second molding tool halves may take between three and five seconds only. This renders the production of single-use plastic molds particularly efficient.

An embodiment of the invention has been explained with the aid of the drawings. However, this embodiment is only an example of how the invention can be embodied. Obviously, modifications to the apparatus and method of the embodiment described are possible without departing from the teaching underlying the instant invention. Therefore, the scope of protection is defined by the appended claims.

The invention claimed is:

1. Apparatus for simultaneously manufacturing a plurality of single-use plastic molds for making contact lenses through injection molding, the apparatus comprising:
    an injection molding tool comprising two molding tool halves (1, 2), a first molding tool half (1) and a second molding tool half (2), the first molding tool half (1) having a first surface (10) and the second molding tool half (2) having a second surface (20), the first and second surfaces (10, 20) facing each other and being essentially plane and arranged parallel to each other,
        wherein the first molding tool half (1) comprises a plurality of first molding members (11) which are arranged on the first surface (10),
        and wherein the second molding tool half (2) comprises a corresponding plurality of second molding members (21) which are arranged on the second surface (20) and opposite to the first molding members (11),
        and wherein in a closed position of the two molding tool halves (1, 2) the corresponding first and second molding members (11, 21) of the first and second molding tool halves (1, 2) each define a cavity (4) between them that corresponds in shape to a single-use plastic mold (5) to be manufactured,
and
    a gripper tool (3) comprising a plurality of gripper members (31) corresponding to the plurality of first and second molding members (11, 21),
        wherein the gripper members (31) are arranged on the gripper tool (3) in a manner corresponding to an arrangement of the first and second molding members (11, 21) on the first and second surfaces (10, 20) of the first and second molding tool halves (1, 2),
        and wherein each of the gripper members (31) is configured to allow suction to be applied thereto,
wherein at least one of the first and second molding tool halves (1, 2) is movably arranged relative to the other of the first and second molding tool halves (1, 2) in a direction perpendicular to the first and second surfaces (10, 20), for moving the first and second molding tool halves (1, 2) into a closed position, in which a flowable plastic material can be injected into the cavities (4) defined between the oppositely arranged first and second molding members (11, 21) and cooled to form the single-use plastic molds (5) that are demoldable, and for moving the first and second molding tool halves (1, 2) that are demoldable into an open position, in which a space is formed between the first and second surfaces (10, 20),
wherein further a front surface of each of the first molding members (11, 21) comprises at least two recesses (113) which are arranged diametrically opposed relative to a central axis (114) of a respective first molding member (11), with the recesses (113) being arranged in a peripheral portion (111) of the front surface of the respective first molding member (11) that corresponds to a rear surface of a flange portion (511) of the respective single-use plastic mold (5) to be manufactured, the recesses (113) being configured to allow a formation of pins (513) projecting from the rear surface of the flange portion (511) of the single-use plastic mold (5) to be manufactured into the recesses (113) in the peripheral portion (111) of the front surface of the first molding member (11) in order to make the single-use plastic mold (5) adhere to the first molding member (11),
and wherein the gripper tool (3) is movably arranged only in a direction parallel to the first surface (10) of the first molding tool half (1) into and out of the space formed between the first and second surfaces (10) of the first and second molding tool halves (1, 2) in the open position, for moving the gripper tool (3) into a transfer position in which the gripper members (31) are arranged opposite of the first molding members (11) so as to be capable of releasing the single-use plastic molds (5) from first molding members (11) and sucking them against the gripper members (31) to transfer the demoldable single-use plastic molds (5) from the first molding members (11) to the gripper members (31), and for subsequently moving the gripper tool (3) with the single-use plastic molds (5) sucked against the gripper members (31) out of the space formed between the first and second surfaces (10, 20).

2. Apparatus according to claim 1, wherein the front surface of each of the first molding members (11) comprises four recesses (113) which are arranged in the peripheral portion (111) of the front surface, the four recesses (113) being arranged angularly equidistantly from each other when viewed in a circumferential direction.

3. Apparatus according to claim 1, wherein the recesses (113) in the front surface of the first molding members (11) of the first molding tool half (1) have a depth (116) in the range of 0.1 mm to 0.5 mm.

4. Apparatus according to claim 1, wherein the recesses (113) in the front surface of the first molding members (11) of the first molding tool half (1) have a circular cross-section with a diameter in a range of 0.5 mm to 1.5 mm.

5. Apparatus according to claim 1, wherein the recesses (113) in the front surface of the first molding members (11) of the first molding tool half (1) have a conical shape that is tapering in a direction away from the front surface (10).

* * * * *